(12) United States Patent
McDermott (10) Patent No.: US 9,055,634 B2
(45) Date of Patent: Jun. 9, 2015

(54) LIGHT EMITTING DIODE LIGHTING DEVICE

(71) Applicant: Kevin McDermott, Rockledge, FL (US)

(72) Inventor: Kevin McDermott, Rockledge, FL (US)

( * ) Notice: Subject to any disclaimer, the term of this patent is extended or adjusted under 35 U.S.C. 154(b) by 0 days.

(21) Appl. No.: 13/864,686

(22) Filed: Apr. 17, 2013

(65) Prior Publication Data

US 2014/0312785 A1 Oct. 23, 2014

(51) Int. Cl.
*H05B 37/02* (2006.01)
*H05B 33/08* (2006.01)

(52) U.S. Cl.
CPC .......... *H05B 33/0815* (2013.01); *Y02B 20/346* (2013.01)

(58) Field of Classification Search
CPC .......... H05B 33/0803; H05B 33/0815; G09G 2300/0842
USPC .......... 315/185 R, 169.1, 291, 161, 294, 307, 315/247
See application file for complete search history.

(56) References Cited

U.S. PATENT DOCUMENTS

| | | | |
|---|---|---|---|
| 7,088,335 B2 * | 8/2006 | Hunter et al. | 345/102 |
| 7,712,925 B2 | 5/2010 | Russell | |
| 7,800,567 B2 * | 9/2010 | Fujino | 345/82 |
| 8,502,477 B2 * | 8/2013 | Sadwick et al. | 315/308 |
| 2006/0028151 A1 * | 2/2006 | Suzuki et al. | 315/291 |
| 2007/0115248 A1 * | 5/2007 | Roberts et al. | 345/102 |
| 2008/0198613 A1 * | 8/2008 | Cruickshank | 362/488 |
| 2008/0219001 A1 * | 9/2008 | Russell | 362/246 |
| 2009/0273290 A1 * | 11/2009 | Ziegenfuss | 315/193 |
| 2010/0245149 A1 * | 9/2010 | Danjo et al. | 341/155 |
| 2010/0254149 A1 * | 10/2010 | Gill | 362/373 |
| 2011/0127917 A1 * | 6/2011 | Roberts et al. | 315/161 |
| 2012/0235575 A1 * | 9/2012 | Roberts et al. | 315/151 |
| 2014/0071714 A1 * | 3/2014 | Li | 363/16 |
| 2014/0132182 A1 * | 5/2014 | Angeles | 315/294 |
| 2014/0159598 A1 * | 6/2014 | Boezen | 315/193 |

OTHER PUBLICATIONS

Tilly, John et al., "Wide Input Range 1A LED Driver Powers High Brightness LEDs with Automotive and 12VAC Supplies," Linear Technology, Design Notes.

* cited by examiner

*Primary Examiner* — Douglas W Owens
*Assistant Examiner* — Syed M Kaiser
(74) *Attorney, Agent, or Firm* — Lowe Hauptman & Ham, LLP (57) ABSTRACT

A lighting device having an electrical circuit includes an LED having a variable illuminating resistance. The electrical circuit is configured for energizing the LED light source with a source of electrical power. The LED light source is energized with an effective power such that the LED light source functions in accordance with a targeted illuminating resistance. The circuit includes one or more components for monitoring circuit parameters, calculating the illuminating resistance of the LED and for changing the effective power applied to the LED light source in response to a relationship between the illuminating resistance and the targeted illuminating resistance. The change in effective power made by the circuit is for returning the illuminating resistance to a predetermined relationship with the targeted illuminating resistance.

25 Claims, 3 Drawing Sheets

LIGHT EMITTING DIODE LIGHTING DEVICE

BACKGROUND

Light emitting diode (LED) lighting devices are replacing incandescent lamp lighting devices in many applications including flashlights, automotive tail lamps, buoy lights, etc. LED lamps offer high efficiency and long life in comparison with incandescent lamp lighting devices.

A standard LED has, for each application, an intensity which is achieved by applying a corresponding constant DC voltage resulting in a constant DC current, resulting in an effective power. The intensity is selected to satisfy requirements for a specific job including longevity, candlepower, power consumption, etc. To achieve the intensity regardless of the voltage of the available source of electrical power, a control circuit is designed to deliver the electrical power to the LED. In general, when supplied with the electrical power, the LED functions with the intensity and longevity.

Although LED lamps are highly efficient, approximately 40 to 80 percent of the electrical energy LED lamps consume turns into heat. The remaining electrical energy becomes emitted light. The generated heat—if not removed from within the LED at a PN junction—can permanently damage the LED.

Also, LEDs change resistance as the temperature of their PN junction changes. The variable resistance of the LED junction makes prevention of overheating or damage to the LED difficult. The variable resistance of the LED junction makes operation of the LED at an intensity or efficiency difficult.

Also, an increase in the electrical power supplied to an LED usually creates a drop in the resistance of the LED. This drop in resistance can change the parameters of the circuit supplying power to the LED possibly causing the circuit to supply either too much or too little electrical power to the LED.

Also, LEDs are prone to damage if either the effective or the instantaneous (illuminating) power delivered by the source of electrical power exceeds the respective power limitation for the LED. Adding to the complexity of LEDs is the fact that a maximum power limitation for the LED is not always a fixed value. The maximum power limitation can change with a number of parameters including ambient temperature, thermal circuit resistance, etc.

LED lamps are typically mounted on a circuit board and within a fixture. The resulting assembly provides a thermal path (thermal circuit) for the heat to be removed from the PN junction. If the thermal circuit is inadequate—in that the thermal circuit is incapable of removing the necessary amount of heat from the PN junction—or if the thermal circuit changes such that the thermal circuit becomes inadequate, the PN junction can overheat and be damaged.

Manufacturers of LED lamps provide state-of-the-art information regarding appropriate circuit control for LED lamps. Cree Inc.—a major manufacturer of LED lamps includes—at its website (Cree.com)—information regarding the thermal characteristics and circuit design parameters for LED lamps. The following information is available on the Cree, Inc. website (application note—thermal management of Cree X Lamp® LEDs and Cree Xlamp® XP-E High Efficiency White LEDs). Major manufacturers of LED lamps invest substantial funds in research and development in an effort to help designers optimize the use—including the circuit design—of LED products. Therefore, an assumption that information regarding the best state-of-the-art circuitry as well as a complete analysis regarding the functioning of the LED can be found at a manufacturer's website is reasonable. Hence, the Cree, Inc. website information is relevant to the present discussion.

An LED control circuit design employs a constant voltage source or voltage regulator in a series circuit arrangement with a resistor and an LED. This arrangement energizes the LED with a preferred voltage, current and power such that the LED emits a preferred intensity of light. However, problems occur if an ambient temperature about the LED increases, in some instances. The increase in ambient temperature inhibits the flow of heat from the PN junction to the atmosphere resulting in an increase in the junction temperature. The increased junction temperature results in a decrease in the electrical resistance of the junction. Since the voltage is held constant, the decrease in the electrical resistance of the junction results in increased current flow, increasing the power supplied to the junction and therefore creating additional heat at the junction. The additional heat further lowers the electrical resistance of the junction and the scenario repeats with the junction temperature further increasing. If the initial preferred power for the LED was close to the maximum power limitation of the LED, an increase in junction temperature can result in failure. Some attempts to ameliorate the increase in junction temperature include selecting an initial power far below the maximum power limitation for the LED. However, this method of ameliorating is not desirable because the method underutilizes an ability of the LED to provide illumination.

Another design employs a battery to provide the constant voltage source. This arrangement usually employs a resistor in series with the battery and the LED to assure that the LED starts out at an initial power. If the series resistor is large enough, the resistor acts as a current limiting device. This second design substantially reduces the possibility of the LED overheating. Unfortunately, the series resistor absorbs a substantial amount of power making this design highly inefficient, in some embodiments. In addition, the initial voltage is lessened as the batteries wear down. The wear down of the batteries reduces the intensity of the LED lowering the intensity of the device such that the device is undesirable for many uses.

Still another design employs a current control circuit providing a preferred constant current for the LED. Linear Technology™ Part number LT 3447 is an example of a constant current control circuit chip. The constant current source supplies a constant current to a single LED or an array of LEDs in a series configuration, etc. If the ambient temperature increases about the LED restricting the flow of heat from the PN junction, the junction temperature will increase resulting—in a typical LED—in a decrease in junction resistance of the PN junction. If the current control circuit does not adjust and maintains the applied voltage across the LED, the current through the LED will (by virtue of a reduction in the LED resistance)—increase thereby potentially overheating and damaging the LED. However, this problem is reduced because in order to maintain the constant target current, the circuit decreases the voltage and therefore the power applied to the LED, until the current returns to the constant current.

Although the constant current circuit, in maintaining the constant current, is helpful in dealing with the problem related to an increasing ambient temperature about the LED, the constant current circuit does not completely solve the problem. The problem is not completely solved because the circuit, in maintaining a preferred constant current, does not protect the LED from overheating. For a given design configuration, a specific increase in the ambient temperature will result in a specific reduction in the magnitude of the thermal energy—heat—being removed from the PN junction by the atmosphere. The specific reduction in the magnitude of the thermal energy being removed from the PN junction effects in an increase in junction temperature, resulting in a specific decrease in the electrical resistance of the PN junction. Since the constant current circuit maintains a preferred current, the specific decrease in the electrical resistance of the PN junction causes a specific decrease in the voltage the circuit applies across the LED, resulting in a specific decrease in the electrical power supplied to the LED. This specific decrease in electrical power supplied to the PN junction reduces the heat added—by the electric circuit—to the PN junction reducing—but not offsetting—the increase in junction temperature created by the ambient temperature increase. The constant current circuit in having the objective of a constant current is prevented from reducing the electric power supplied to the LED by a magnitude sufficient to effect a reduction in the heat generated equal to the reduction in the heat being removed from the LED by the thermal path due to an ambient temperature increase. Thus, although the constant current circuit does reduce the electric power supplied to the LED junction, the constant current circuit does not prevent an increase in junction temperature resulting from an increase in ambient temperature. In order to avoid under powering the LED—the power for many designs is close to the maximum power (maximum junction temperature) that the LED can handle. Therefore, the LED is subject to being damaged by a small change in operating parameters—such as ambient temperature—even when the LED is energized by a constant current circuit. A circuit design for powering an LED which has as an objective of maintaining the current at a constant value is limited in the ability to protect the LED from overheating. The constant current circuit is designed to maintain a preferred current. The constant current circuit does not seek to maintain the resistance of the LED as to be later described.

Yet another design for an LED control utilizing dynamic resistance of LEDs utilizes the dynamic resistance of an array of LEDs to maintain the current through the LEDs at a desired level. This dynamic resistance design is similar to the constant current circuit in which an internal current sensing resistor of a constant current microchip circuit responds to a change in the current supplied to the LED array by creating a signal. The signal adjusts the current flowing into the load or LED to counter the changing current and return the sensed value of the current to the constant current level. Therefore, the dynamic resistance design has the same deficit as the constant control circuit in that the dynamic resistance design does not prevent the LED from being damaged by overheating due to increases in the ambient temperature. The dynamic resistance design is limited in that the design requires an array of LED lamps with a dynamic resistance matched to the current control circuit. Finally, the dynamic resistance design does not maintain the variable illuminating resistance of the LED at a targeted illuminating resistance value.

In order to properly adjust the circuit to counter increases in the ambient temperature to prevent damaging the LED, some designs add a thermally sensitive resistor—thermistor—to the circuit to interact with the current control device. An example of this design can be found in Linear Technology Corp design note 388 FIG. 6 in which auxiliary components are added to constant current control circuit LT 3474. The thermally sensitive resistor is typically mounted on the printed circuit board close to the LED and upon an increase in ambient temperature sends a signal to the current control device to change the target value of constant current to a new value of which is appropriate for the existing ambient temperature. For example, if the ambient temperature was increasing, the thermally sensitive resistor would send a signal to the current control device to reduce the target constant current to the LED to avoid damage to the LED. This system is an improvement over the basic constant current circuit as the system does initiate actions to protect the LED from overheating. However, the system is deficient in that there is a time lag—due to the separation between the PN junction of the LED and the thermistor—before the thermally sensitive resistor sends a signal to the constant current control device. In addition, the thermally sensitive resistor is not positioned precisely at the PN junction. Therefore, the system does not experience the same temperature change as the PN junction, in some instances. Since the thermally sensitive resistor does not reliably experience the same temperature change as the PN junction, the thermally sensitive resistor signal to the current control device does not solve the ambient temperature problem. Thus, all above designs have a defect in protecting the LED from damage. In addition all above designs do not maintain the load resistance of the LED at a targeted value.

SUMMARY

An LED lighting device having a circuit for energizing one or more LED lamps—includes a target illuminating resistance for the one or more LED lamps. The one or more LED lamps have a variable illuminating resistance responsive to the ambient temperature. The circuit determining the illuminating resistance for the one or more LED lamps, comparing the measured illuminating resistance with the target illuminating resistance and upon a changing ambient temperature about the LEDs effecting an inequality between the two resistances, adjusting the effective power supplied to the one or more LED lamps to return the illuminating resistance to the target illuminating resistance.

DETAILED DESCRIPTION

A common cause of LED lamp failure results from the fact that LED lamps are damaged when a PN junction temperature exceeds a maximum value. The LED junction temperature increases as a result of several factors including sunlight shining on the LED, an increase in the temperature of the ambient air, heat from adjacent lamps, electronic components emitting heat towards the LED or excessive electric power applied to the LED, etc. Typically energy is added to the PN junction, by virtue of electric power applied to the PN junction. Approximately 40-80% of the electric power supplied to the PN junction turns into heat. The remaining energy turns into light which leaves the junction as light. The portion of the electric energy applied to the junction which turns into heat leaves the PN junction through thermal conduction, thermal convection and radiation. Since the LED junction is easily damaged by overheating, an LED operating at a maximum effective power (maximum junction temperature) has a supplied electric power reduced if the ambient temperature about the LED is increased. The supplied electric power is reduced because an increase in ambient temperature reduces the flow of heat from the PN junction eventually increasing the temperature of the PN junction. In order to counter the potential increase in temperature of the PN junction due to an increase in ambient temperature, the effective electrical power applied to the junction is reduced. An adequate reduction in effective electrical power helps prevent the LED junction temperature from increasing beyond a safe limit. In general, if the reduction in the magnitude of the portion of effective electrical power supplied to the PN junction which turns into heat equals the magnitude of the reduction of heat energy leaving the PN junction through thermal conduction and other means, the temperature of the PN junction will not change.

The variable resistance of the LED creates problems when energizing a lighting device having an LED light source. Upon being energized, the PN junction of the LED receives energy from the electrical control circuit and disposes that energy through emitted light and emitted heat. Although heat is removed from the LED by radiation, convection and conduction, typically most of the heat is transmitted by conduction. The temperature of the PN junction becomes stabilized when the energy supplied by the electrical control circuit equals the sum of the emitted light energy plus the transmitted heat energy. If the energy from the electrical circuit supplied to the PN junction exceeds the outgoing energy from the PN junction, the temperature of the PN junction increases until equilibrium is achieved.

The temperature of the PN junction will increase if the effective electrical power supplied to the LED by the control circuit increases because an increase in electrical power increases the energy input to the PN junction. The PN junction temperature will also increase if the ambient temperature surrounding the LED increases as an increase in ambient temperature would reduce the transmission of heat energy from the PN junction. In some embodiments, the PN junction temperature also increases if adjacent circuit components emit heat, resulting in a reduction of the heat that can be transmitted from the PN junction towards that nearby circuit component. In some embodiments, the PN junction temperature also increases if the LED is subjected to bright sunlight or adjacent powerful lights which radiate energy towards its PN junction. In some embodiments, the PN junction temperature also increases if the thermal resistance between the PN junction and the ambient increases due to a shifting of components, oxidation, etc. Thus, in some embodiments, there are many scenarios which cause the temperature of the PN junction to increase.

In a typical circuit employing a 3 watt LED, a typical maximum PN junction temperature could be 150° C. As the temperature of that PN junction increases towards 150° C., the PN junction resistance decreases. If the temperature of the PN junction continues to increase beyond 150° C., in some embodiments, the PN junction will overheat, the PN junction resistance will increase and the LED will be permanently damaged. Presently, there is no easy, accurate, economical and acceptable way to measure the junction temperature of LEDs employed in a typical commercial circuit.

The varying junction resistance (varying illumination resistance) creates many problems for the circuit designer in his attempt to employ LED lamps at their maximum output and in a manner that does not precipitate excessive PN junction temperature resulting in overheating failure. The inability to measure the junction temperature of LED lamps in everyday circuits is a limitation in the effort to protect them from overheating. The LED has a variable illuminating resistance and this resistance varies depending upon a number of parameters including ambient temperature, the effective electrical power applied to the LED, etc. At any point in time, a measured value for the illuminating resistance of the LED would indicate an illuminating resistance of a fixed value. The circuit to be later described uses the concept that the variable illuminating resistance of the PN junction can be accurately and economically measured for an LED lamp in a circuit and that the measured illuminating resistance is an acceptable indicator of the condition and temperature of the PN junction. In some embodiments, the circuit energizes a plurality of LEDs in a series arrangement with each LED having a variable illumination resistance. In those embodiments, determining the illuminating resistance of the plurality of LEDs is possible by dividing the illumination voltage of the plurality of LEDs by the illumination current of the plurality of LEDs. Other LED configurations have the group illuminating resistance determined by the circuit using classical analysis programmed into a microcontroller. In some embodiments, the circuit measures circuit parameters such as voltages which are functions of the illuminating resistance of the PN junction and then uses those measurements to estimate the illuminating resistance of the PN junction. The measurements—which are typically taken with high frequency—also permit the circuit to determine the effective power, illuminating power and illuminating current supplied to the LED. The circuit is typically programmed with a target illuminating resistance. In lieu of having a circuit programmed with a target illuminating resistance, in some embodiments, the circuit includes predetermined resistors which permit the circuit to determine the intended target illuminating resistance. In some embodiments, the present circuit is programmed providing the circuit with a maximum illuminating voltage, a maximum effective power, a maximum illuminating resistance and a minimum illuminating resistance.

Upon the LED being energized by a power supply, the circuit measures the illuminating voltage at several locations within the circuit permitting the microcontroller to calculate the illuminating resistance, the illuminating current of the LED, the illuminating power of the LED and the effective power of the LED. The microcontroller then compares the illuminating resistance with the target illuminating resistance. Based upon a predetermined relationship between the measured illuminating resistance and a target illuminating resistance, the circuit responds by adjusting the effective power applied to the LED to protect the LED from overheating maintain the intensity of the LED, maintain the color of the LED, maximize the illumination from the LED, etc. In some embodiments, maintaining the illuminating resistance at a target illuminating resistance has the effect of maintaining the color of the emitted light-preventing color shift. In some embodiments, maintaining the illuminating energy at a target illuminating energy maintains the intensity of the emitted light. In some embodiments, maintaining the effective energy at a target effective energy maintains the intensity of the emitted light. In some embodiments, the predetermined relationship maintains the illuminating resistance at the target illuminating resistance and for those embodiments if the resistances are equal, no action is taken. However, if the illuminating resistance is different than the target illuminating resistance. This difference causes the circuit to adjust the effective power to the LED. This adjustment in effective power input to the PN junction adjusts the temperature of the PN junction and consequently the PN junctions illuminating resistance. This process continuously and quickly repeats until the illuminating resistance is brought back to the target illuminating resistance.

In some embodiments, the circuit design is constantly measuring the illuminating resistance and adjusting the circuit to compensate for changes in ambient conditions and/or changes in the power supplied to the LED. If, for example, the ambient temperature increases, the increase would result in a lowering of the illuminating resistance. However, in some embodiments, the circuit quickly senses the lowering of the illuminating resistance and almost instantaneously responds by decreasing the effective power supplied to the LED to counter the lowering effect of the ambient temperature and to bring the illuminating resistance back to the target illuminating resistance. The circuit therefore maintains the illuminating resistance at a targeted value. The circuit protects the LED from thermal damage because the prelude to thermal damage is typically a drop in the illuminating resistance below the minimum illuminating resistance previously entered into the program. Since the target illuminating resistance is set higher than the minimum illuminating resistance and the minimum illuminating resistance is an indicator that the condition of the PN junction is approaching failure the circuit in maintaining the illuminating resistance at, or very near, the target illuminating resistance helps assure that the PN junction is prevented from overheating.

Another operational scenario occurs if the ambient temperature decreases. In this case, the decrease in ambient temperature increases the flow of heat from the PN junction thereby decreasing the temperature of the PN junction and thereby increasing its illuminating resistance. In this scenario, the circuit responds by increasing the power applied to the PN junction thereby increasing the temperature of the PN junction causing a decrease in the illuminating resistance such that its value returns to the target illuminating resistance. The present circuit in constantly adjusting the illuminating resistance towards the target illuminating resistance prevents the PN junction from overheating and the LED from failing, in some embodiments.

In some embodiments, the LED is energized with a control system (constant voltage, constant current, etc.) and the circuit interferes with the control system when the illuminating resistance of the LED dropped below a minimum illuminating resistance. In this case the target illuminating resistance would be set at the minimum illuminating resistance. The circuit would be preprogrammed to know the minimum acceptable illuminating resistance.

In some embodiments, the LED is energized with a control system and the circuit only interferes with the control system when the illuminating resistance of the LED is exterior to a range of illuminating resistance. Restated, the circuit interferes with the control system when the illuminating resistance of the LED is not in a predetermined relationship with the target illuminating resistance, in some embodiments. The range of resistance of the illuminating resistance extends from the minimum illuminating resistance to the maximum illuminating resistance preprogrammed into the circuit. If the illuminating resistance of the LED was changed by an environmental event such as ambient temperature and the change placed the illuminating resistance exterior to the range the circuit would reduce the effective power applied to the LED, in some embodiments. The change in effective power (typically a reduction in effective power) reduces the possibility of the LED being permanently damaged. The change in effective power also reduces the possibility of the circuit components being damaged, in some embodiments.

Figure 1:
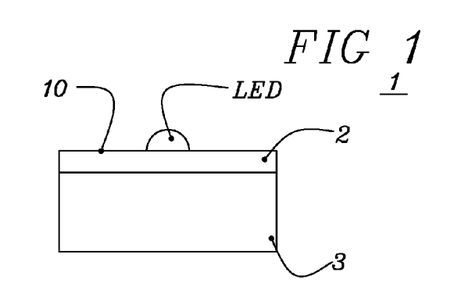
FIG. 1 is a side view of a lighting device according to some embodiments.

FIG. 1 is a side view of a lighting device 1 according to some embodiments. Lighting device 1 includes a circuit board 2 mounted on a cylindrical base 3. Circuit board 2 includes a circuit 10 to be later described. Cylindrical base 3 includes a power supply PS (not shown).

References within this application regarding the illuminating resistance, target illuminating resistance, variable illuminating resistance, illuminating current and illuminating power refer to those parameters of the light emitting diode LED determined when the light emitting diode LED is conducting electricity and emitting light. In addition, the determination regarding the magnitude of the various illuminating parameters mentioned in this application is typically made by making a plurality of instantaneous determinations for each parameter and averaging those determinations with the average value of each parameter used as the illuminating value of that parameter. If the circuit is supplying a constant voltage, current and power to the light emitting diode LED and the lighting emitting diode LED is continuously emitting light, then the illuminating values of resistance, current, voltage and power will not substantially vary amongst the instant determinations and each instant determination of the parameter will be substantially equal to the average value of the determination.

For those situations in which light emitting diode LED is energized by a pulsing circuit, measurements of illuminating parameters are taken only within each "ON" pulse of the waveform of voltage versus time. In some embodiments, accuracy is improved if a plurality of measurements is taken for each circuit parameter with each measurement taken from within a separate "ON" pulse. An average value of the plurality of measurements is then used by the microcontroller to make adjustments to the effective power being supplied to the LED, in some embodiments. In some embodiments, accuracy is further improved if several measurements of each circuit parameter are taken within each "ON" pulse, repeated for a plurality of "ON" pulses with all of the measurements for each parameter averaged. Contingent upon the circuit objectives and the waveform of the pulsing circuit taking a single measurement of each required parameter and provide an acceptably accurate representation of that parameter is possible, in some embodiments. The single measurement procedure becomes more acceptable as the waveform of the circuit approaches a constant line. The single measurement are taken during the time the light emitting diode LED is emitting light—"ON" pulse—and at an appropriate time within the "ON" pulse such that the single measurement is indicative of the value of the illuminating parameter during the pulse, in some embodiments. Analyzing the waveform of the pulse with an oscilloscope would be helpful in deciding the appropriate time for the measurements. The microcontroller is easily programmed to take the required measurements at the appropriate location of the waveform, in some embodiments.

The present circuit analyzes and employs two types of power. The first type of power is illuminating power which, as previously described is the instantaneous power being supplied to the LED when the LED is illuminating or "ON".

The second type of power is effective power which is calculated by taking a plurality of instantaneous measurements with each measurement determining an instantaneous power. Typically, the measurements and instantaneous power determinations are taken at equal time intervals, over a reasonable number of cycles of the pulsing circuit and then averaged to determine the effective power. Unlike the measurements taken to determine illuminating power the measurements for the determination of effective power are taken without regard to the illuminating status of the LED. Effective power represents a total amount of electrical energy being supplied to the LED over a given time span. The energy is supplied to the LED in the form of a constant or varying voltage circuit, in some embodiments. In the case that the circuit is supplying a pulsing waveform with "ON & OFF" zones, some of the instantaneous measurements for determining effective power indicate that no power is being supplied. Effective power is important because the circuit adjusts the effective power being delivered to the LED as a means to maintain the temperature and illuminating resistance of the PN junction at a target value.

Figure 2:
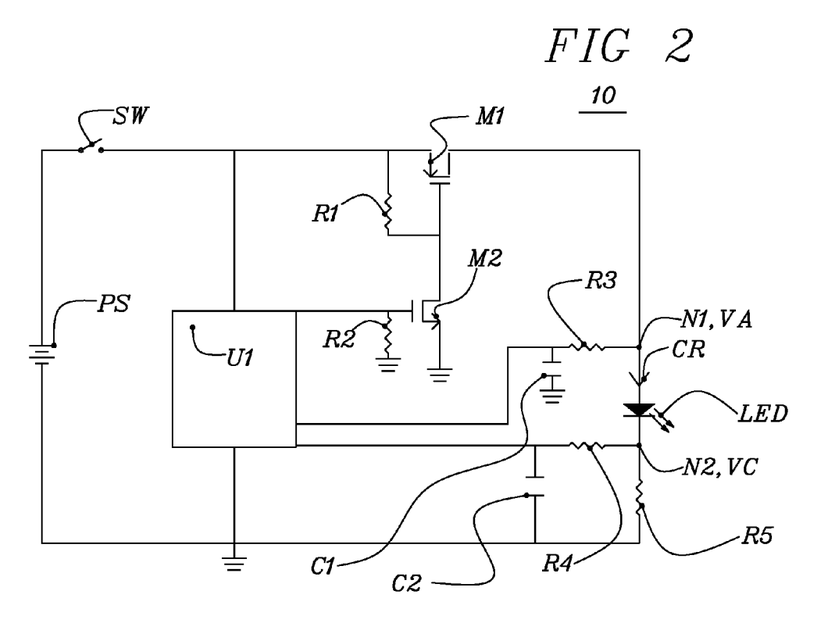
FIG. 2 is a schematic diagram of a circuit according to some embodiments.

FIG. 2 is a schematic diagram of circuit board 10 from FIG. 1 according to some embodiments. Circuit 10 comprises a microcontroller U1 used to sense the illuminating resistance of light emitting diode LED and control the illuminating voltage and illuminating current supplied to light emitting diode LED. In some embodiments, microcontroller U1 comprises part number PIC12F1822 Mfr. Microchip Inc. In some embodiments, light emitting diode LED comprises part number XPEW HT-L1-0000-00E01 Mfr. Cree Inc. Light emitting diode LED has a variable illuminating resistance with the resistance changing in response to ambient temperature, power input, thermal resistance of the PN junction, etc. Microcontroller U1 includes an ADC (Analog to Digital Converter), a PWM (Pulse Width Modulation) Module, and sufficient I/O (Input/Output) ports to operate circuit 10. Microcontroller U1 is preprogrammed with a maximum illuminating power and a maximum effective power that can be supplied to power light emitting diode LED. Microcontroller U1 is also preprogrammed with a maximum illuminating resistance RLM, a minimum illuminating resistance RLX and a target illuminating resistance RT for light emitting diode LED. For some circuit configurations the pre-programming of microcontroller U1 does not include all of the above mentioned parameters. Other microcontrollers with similar characteristics are utilized, in some embodiments. One skilled in the art of programming would be able to create code to properly function within circuit 10 as described herein. Circuit 10 further comprises a power source PS, used to power circuit 10. In some embodiments, power source PS is a 4.5 volt power supply. A switch SW is used to energize circuit 10 with power source PS. A transistor M1, a transistor M2, a resistor R1, and a resistor R2 are used to create a high side switch controlled by microcontroller U1. In some embodiments, transistor M1 comprises part number NDS332P Mfr. Fairchild Semiconductor. In some embodiments, transistor M2 comprises part ZXMN2A01E6TA Mfr. Zetex Inc. In some embodiments, resistor R1 is a 1K ohm resistor number. In some embodiments, resistor R2 is a 10K ohm resistor. Resistor R1 and resistor R2 are pull-up and pull down resistors, respectively. A resistor R5 is used to sense an illuminating current CR flowing through light emitting diode LED. In some embodiments, resistor R5 is a 0.2 ohm resistor. Resistors R3 and R4, and capacitors C1 and C2 form an input filter configured to aid microcontroller U1 in sensing an illuminating anode voltage VA at a node N1 and an illuminating cathode voltage VC at a node N2. In some embodiments, resistors R3 and R4 are 6.2 K ohm resistors. In some embodiments, capacitors C1 and C2 are 0.1 µf capacitors. In operation, when switch SW is closed, circuit 10 is energized with power source PS whereupon microcontroller U1 begins operating. Microcontroller U1 senses illuminating anode voltage VA at node N1 and illuminating cathode voltage VC at node N2. Using this information and other information from a plurality of circuit parameters microcontroller U1 calculates and determines illuminating current CR which is the current flowing through light emitting diode LED and resistor R5. Microcontroller U1 also calculates the illuminating power, the effective power and the illuminating resistance RL of light emitting diode LED.

Microcontroller U1 compares illuminating resistance RL with target illuminating resistance RT and if microcontroller U1 identifies a difference between illuminating resistance RL and target illuminating resistance RT microcontroller U1 sends a signal S1 to change the effective power applied to light emitting diode LED. In some embodiments, signal S1 is a PWM signal. In some embodiments, signal S1 will not be a PWM signal but will change the effective power by adjusting the voltage applied to the LED. Circuit 10 uses microcontroller U1 to create PWM signals to adjust the effective power applied and therefore the illuminating resistance RL of the LED to maintain the illuminating resistance at a target value. In contrast, other circuits do not employ a target illuminating resistance, do not compare a target illuminating resistance with a measured illuminating resistance and do not adjust the effective power in response to a relationship between the target illuminating resistance and the measured illuminating resistance. Based upon a target illuminating resistance RT of light emitting diode LED and in order to assure that light emitting diode LED is energized with the effective power sufficient to maintain illuminating resistance RL at—or at least near—target illuminating resistance RT, microcontroller U1 adjusts a duty cycle of signal S1 to adjust the effective power supplied to light emitting diode LED to bring illuminating resistance RL towards target illuminating resistance RT. If illuminating resistance RL is less than target illuminating resistance RT, indicating too much power is being delivered to light emitting diode LED, microcontroller U1 decreases the duty cycle of PWM signal S1 thereby reducing the effective power supplied to light emitting diode LED. If a resistance difference exists, such as illuminating resistance RL is more than target illuminating resistance RT indicating that light emitting diode LED is underpowered and more power is able to be supplied, microcontroller U1 increases the duty cycle of signal S1 thus increasing the effective power supplied to light emitting diode LED. Thus, Circuit 10 energizes light emitting diode LED at the effective power sufficient to maintain illuminating resistance RL at target illuminating resistance RT throughout variations in ambient temperature.

Circuit 10 provides options regarding how and if the effective power applied to the LED is changed. In the above mentioned example the effective power is changed whenever the illuminating resistance of the LED is not equal to the target illuminating resistance. However, in some embodiments, circuit 10 would adjust the effective power when the illuminating resistance of the LED, as measured by the microcontroller, drops below a minimum illuminating resistance acceptable for the LED. Other embodiments additionally adjust the effective power when the illuminating resistance of the LED exceeds the maximum illuminating resistance acceptable for the LED.

Figure 3:
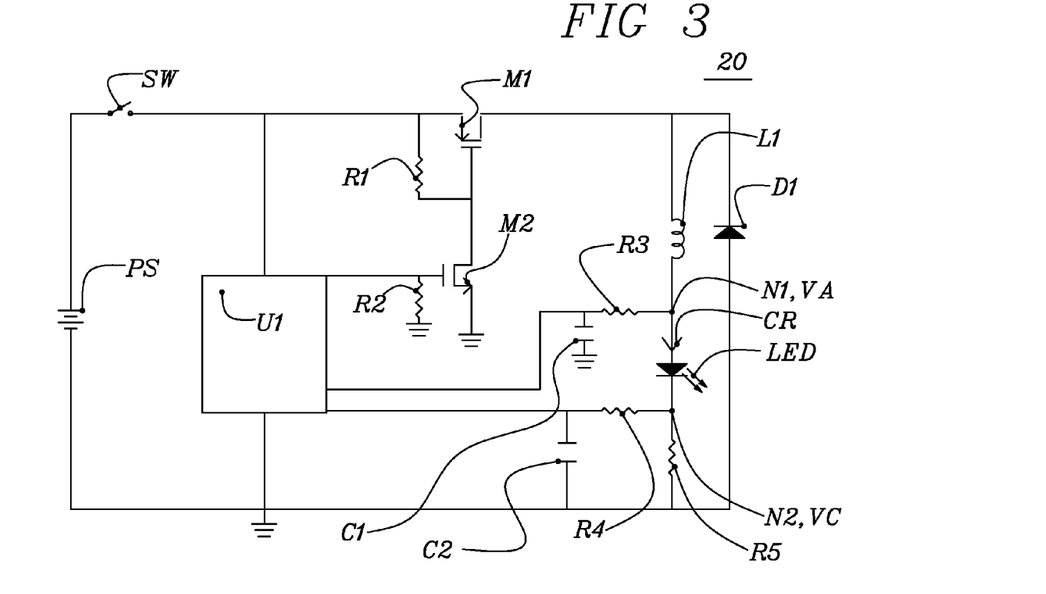
FIG. 3 is a schematic diagram of a circuit according to some embodiments.

FIG. 3 is a schematic diagram of a circuit 20 according to some embodiments. In some embodiments, circuit 20 is used in place of circuit 10 of FIG. 2. Circuit 20 is similar to circuit 10 of FIG. 2 with the addition of a feedback loop, including inductor L1 and diode D1. In some embodiments, inductor L1 comprises 100 micro henry part number SDR1005-101KL Mfr. Burns, Inc. In some embodiments, diode D1 comprises part number DFLS14OL Mfr. Diodes, Inc. Inductor L1 dampens the peak current when the voltage from power supply PS is higher than the voltage sufficient to power light emitting diode LED to achieve its target illuminating resistance RT and stores the energy. Diode D1 is included in the feedback loop to continue the flow of current through light emitting diode LED and discharge inductor L1 when transistor M1 and transistor M2 are switched off to thereby utilize the energy stored in inductor L1. The feedback loop of circuit 20 increases the efficiency of circuit 10 and typically increases the light output of light emitting diode LED.

Figure 4:
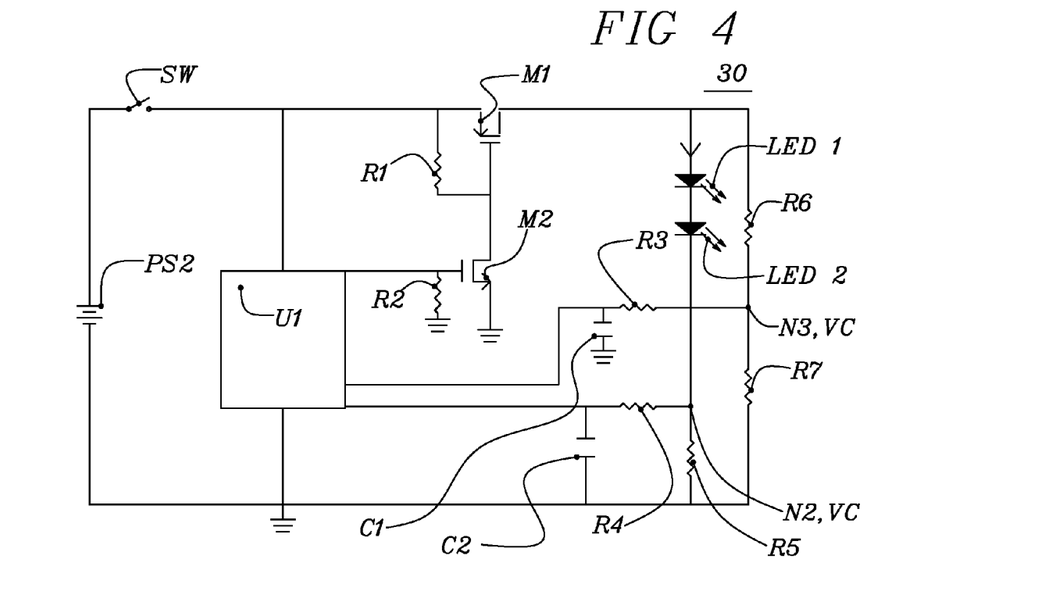
FIG. 4 is a schematic diagram of a circuit according to some embodiments.

FIG. 4 is a schematic diagram of a circuit 30 according to some embodiments. Circuit 30 functions similar to circuit 10 of FIG. 2, except circuit 30 is energizing two LEDs including a light emitting diode LED1 and a light emitting diode LED2, in place of the single light emitting diode LED of circuit 10.

In some embodiments, LED 1 and LED 2 can be considered an LED light source. In some embodiments, an LED light source can be a single LED as found in FIG. 1. In some embodiments, an LED light source can be a plurality of LEDs arranged in a series, parallel or any acceptable circuit arrangement. In some embodiments, when an LED light source having a plurality of LEDs is employed, the illuminating resistance, illuminating power, effective power, illuminating voltage, etc. are all measured as if the plurality of LEDs were a single LED. In some embodiments, circuit 30 is substituted for circuit 10. Circuit 30 also includes power source PS2 in place of power source PS of circuit 10. Light emitting diode LED1 and light emitting diode LED2 are substantially equal to light emitting diode LED of circuit 10. In some embodiments, power source PS2 is a 6 volt power supply. Circuit 30 further comprises a resistor R6 and a resistor R7 which form a voltage divider network designed so that the voltage at node N1 is double the value of the voltage at a node N3. In some embodiments, resistor R6 is a 10 K ohm resistor. In some embodiments, resistor R7 is a 10K ohm resistor. The ratio between the voltage at node N1 and the voltage at node N3 is used so that the maximum voltage at the input pin of microcontroller U1 is not exceeded. The ratio is employed to help microcontroller U1 by limiting a voltage handled by the microcontroller. Microcontroller U1 calculates the combined variable illuminating resistance of light emitting diode LED 1 and light emitting diode LED2. Microcontroller U1 controls the combined illuminating resistance of the plurality of LEDs in the same way that circuit 10 controlled the illuminating resistance of the single light emitting diode LED. Circuit 30 measures and adjusts the illuminating resistance and effective power supplied to light emitting diode LED1 and light emitting diode LED2 in circuit 30 as if the light emitting diodes were a single light emitting diode in a similar manner as circuit 10 adjusts those parameters for the single light emitting diode LED. Circuit 30 treats light emitting diode LED1 and light emitting diode LED2 as a single entity; hence the combined illuminating resistance is maintained at a target illumination resistance with the target illumination resistance based upon the two light emitting diodes.

In some embodiments, additional light emitting diodes are added in either a series or a parallel configuration to circuit 30 and still employ the concept described above. Someone skilled in the field of electronics would recognize the ability to change the values of resistor R6 and resistor R7 so that the sensed illuminating voltage applied to the input terminal of microcontroller U1 remains within the acceptable range of input parameters for the microcontroller.

Figure 5:
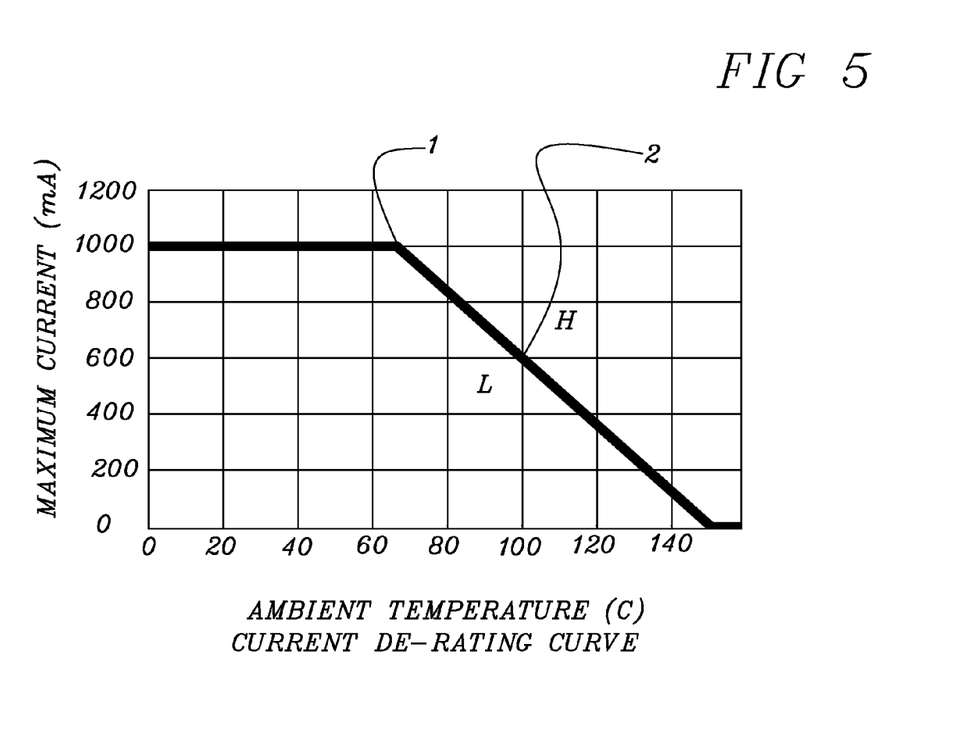
FIG. 5 is a graph of a maximum current versus an ambient temperature for an LED.

FIG. 5 is a graph of a maximum current versus an ambient temperature for a light emitting diode. If the light emitting diode is energized such that the light emitting diode is in zone H representing a right side of the graph, a junction temperature will exceed 150° C., possibly damaging the junction. If the light emitting diode is energized such that the light emitting diode is in zone L, the light emitting diode is being operated properly with the junction temperature below 150° C. which helps to realize a long life of the light emitting diode. If the light emitting diode is operated at location 1 at an ambient temperature of 68° C. at a maximum current of 1000 mA, the light emitting diode will experience a long life because the junction temperature is at approximately 150° C. However, if the current is increased beyond 1000 mA the LED will be operating in zone H with the junction temperature above 150° C. and the life of the light emitting diode is compromised. If the ambient temperature is increased from 68° C. to 100° C., the light emitting diode current is reduced from 1000 mA to 600 mA to maintain operation within zone L. FIG. 5 graphically demonstrates problems relating to a constant current power supply. If a 1000 mA constant current power supply is energizing an LED at location 1 at 68° C. and the ambient temperature increases, the LED begins to operate in zone H unless the 1000 mA constant current is reduced. Since the constant current circuit prevents the necessary current change, the constant current circuit prevents protection of the LED and exposes the LED to a junction temperature beyond 150° centigrade.

Although the above disclosed circuits 10, 20 and 30 functioned with a microcontroller, some circuit configurations of the present disclosure employ components including operational amplifiers in place of the microcontroller.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed:

1. A lighting device comprising:
an electrical circuit having a target illuminating resistance, said electrical circuit configured to:
energize a light emitting diode (LED) having a variable illuminating resistance with a first effective power from a source of electrical power for said LED having said target illuminating resistance,
cause a change in the first effective power in response to a change of the illuminating resistance from said target illuminating resistance to a second illuminating resistance, and
change in the first effective power for said circuit energizing said LED to a second effective power in place of said first effective power for reducing a difference between said second illuminating resistance and said target illuminating resistance.

2. The lighting device according to claim 1, wherein:
said electrical circuit comprises a microcontroller configured to provide a pulse width modulated signal for effecting the change in the first effective power.

3. The lighting device according to claim 1, wherein:
said electrical circuit comprises a microcontroller configured to identify the change of the illuminating resistance, and effect the change in the first effective power.

4. The lighting device according to claim 1, wherein:
said electrical circuit comprises a microcontroller configured to provide said target illuminating resistance, determine the illuminating resistance, identify the change of the illuminating resistance and provide a pulse width modulated signal for effecting the change in the first effective power.

5. The lighting device according to claim 1, wherein:
said electrical circuit comprises a microcontroller configured to provide a pulse width modulated signal for effecting the change in the first effective power, and
said electrical circuit having a feedback loop including an inductor and a diode configured to increase an efficiency of said electrical circuit.

6. The lighting device according to claim 1, wherein:
said electrical circuit comprises a plurality of LEDs in a series arrangement with said LED.

7. The lighting device according to claim 1, wherein:
said electrical circuit comprises at least one of a resistor configured to establish said target illuminating resistance.

8. The lighting device according to claim 1, wherein:
said change of the illuminating resistance is a result of a change of an ambient temperature about said LED.

9. A lighting device comprising:
an electrical circuit having a target illuminating resistance, the electrical circuit configured to:
energize a light emitting diode (LED) light source, said LED light source having a variable illuminating resistance,
energize said LED light source with a first effective power from a source of electrical power for said LED light source having said target illuminating resistance,
cause a change in the first effective power in response to a change of the illuminating resistance of said LED light source from said target illuminating resistance to a second illuminating resistance, and
change in the first effective power for said circuit energizing said LED light source to a second effective power in place of said first effective power for reducing a difference between said second illuminating resistance and said target illuminating resistance.

10. The lighting device according to claim 9, wherein:
said electrical circuit comprises a microcontroller configured to provide a pulse width modulated signal for effecting the change in the first effective power.

11. The lighting device according to claim 9, wherein:
said electrical circuit comprises a microcontroller configured to identify the change of the illuminating resistance and for effecting the change in the first effective power.

12. The lighting device according to claim 9, wherein:
said electrical circuit comprises a microcontroller configured to provide said target illuminating resistance, determine the illuminating resistance, identify the change of the illuminating resistance and provide a pulse width modulated signal for effecting the change in the first effective power.

13. The lighting device according to claim 9, wherein:
said electrical circuit comprises a microcontroller configured to identify the change of the illuminating resistance and provide a pulse width modulated signal for effecting the change in the first effective power.

14. The lighting device according to claim 9, wherein:
said electrical circuit comprises a microcontroller configured to identify the change of the illuminating resistance and provide a pulse width modulated signal for effecting the change in the first effective power, and
said electrical circuit comprises a feedback loop including an inductor and a diode configured to increase an efficiency of said circuit.

15. The lighting device according to claim 9, wherein:
said light emitting diode (LED) light source comprises a plurality of LEDs.

16. The lighting device according to claim 9, wherein:
said light emitting diode (LED) light source comprises an LED.

17. The lighting device according to claim 9, wherein:
said electrical circuit comprises at least one of a resistor configured to establish said target illuminating resistance.

18. The lighting device according to claim 1, wherein:
said change of the illuminating resistance is a result of a change of an ambient temperature about said LED.

19. A lighting device comprising:
an electrical circuit having a target illuminating resistance, the electrical circuit configured to:
energize at least one of a light emitting diode (LED) having a variable illuminating resistance with a first effective power from a source of electrical power for the LED having said target illuminating resistance,
determine the illuminating resistance of the at least one LED and, a difference between the illuminating resistance and said target illuminating resistance, and
cause a circuit power change for energizing the at least one LED with a second effective power in place of said first effective power in response to the difference for reducing the difference.

20. The lighting device according to claim 19, wherein:
said electrical circuit comprises a microcontroller configured to provide a pulse width modulated signal for effecting the change in the circuit power.

21. The lighting device according to claim 19, wherein:
said electrical circuit comprises a microcontroller configured to determine the difference and effect the change in the circuit power.

22. The lighting device according to claim 19, wherein:
said electrical circuit comprises a microcontroller configured to provide said target illuminating resistance, determine the illuminating resistance, determine the difference between the illuminating resistance and said target illuminating resistance and provide a pulse width modulated signal for effecting the change in the circuit power.

23. The lighting device according to claim 19, wherein:
said electrical circuit comprises a microcontroller configured to identify the change of the illuminating resistance and provide a pulse width modulated signal for effecting the change in the circuit power, and
said electrical circuit comprises a feedback loop including an inductor and a diode for increasing an efficiency of said circuit.

24. The lighting device according to claim 19, wherein:
said electrical circuit comprises a plurality of LEDs in a series arrangement with the at least one LED.

25. The lighting device according to claim 19, wherein:
said electrical circuit comprises at least one of a resistor configured to establish said target illuminating resistance.

* * * * *